(12) United States Patent
Kirchhoefer et al.

(10) Patent No.: US 11,525,028 B2
(45) Date of Patent: Dec. 13, 2022

(54) BIODEGRADABLE AND/OR BIOABSORBABLE THERMOPLASTIC POLYURETHANES

(71) Applicant: Lubrizol Advanced Materials, Inc., Cleveland, OH (US)

(72) Inventors: Cathrin G. Kirchhoefer, Obernbreit (DE); Andrew P. Dove, Kenilworth (GB); Anthony J. Walder, Essex, MA (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 33 days.

(21) Appl. No.: 16/986,426

(22) Filed: Aug. 6, 2020

(65) Prior Publication Data

US 2020/0362091 A1 Nov. 19, 2020

Related U.S. Application Data

(63) Continuation of application No. 16/088,849, filed as application No. PCT/US2017/025243 on Mar. 31, 2016, now abandoned.

(60) Provisional application No. 62/315,793, filed on Mar. 31, 2016.

(51) Int. Cl.
| | | |
|---|---|---|
| *C08G 18/75* | (2006.01) | |
| *C08G 18/10* | (2006.01) | |
| *C08G 18/32* | (2006.01) | |
| *C08G 18/38* | (2006.01) | |
| *C08G 18/42* | (2006.01) | |
| *C08G 18/66* | (2006.01) | |
| *C08L 75/04* | (2006.01) | |

(52) U.S. Cl.
CPC .......... *C08G 18/758* (2013.01); *C08G 18/10* (2013.01); *C08G 18/3206* (2013.01); *C08G 18/3848* (2013.01); *C08G 18/4277* (2013.01); *C08G 18/6637* (2013.01); *C08L 75/04* (2013.01); *C08G 2230/00* (2013.01); *C08L 2201/06* (2013.01)

(58) Field of Classification Search
CPC .. C08G 18/758; C08G 18/10; C08G 18/3206; C08G 18/3848; C08G 18/4277; C08G 18/6637; C08G 2230/00; C08L 75/04; C08L 2201/06
USPC ...................................................... 524/591
See application file for complete search history.

(56) References Cited

U.S. PATENT DOCUMENTS

| | | | |
|---|---|---|---|
| 10,023,738 B2 * | 7/2018 | Makal | C08G 18/4266 |
| 2015/0291791 A1 * | 10/2015 | Makal | C08G 18/4266 |
| | | | 502/402 |

FOREIGN PATENT DOCUMENTS

| | | | | |
|---|---|---|---|---|
| DE | 4204995 A1 * | 9/1993 | ........... | C07D 241/08 |
| DE | 4204995 A1 | 9/1993 | | |
| WO | 2013/142969 A1 | 10/2013 | | |

OTHER PUBLICATIONS

Rafiemanzelat et al. "Synthesis of new poly(ether-urethane-urea)s based on amino acid cyclopeptide and PEG: study of their environmental degradation", Amino Acids (2013), 44, pp. 449-459. (Year: 2013).*

Rafiemanzelat et al. "Fast and eco-friendly synthesis of new hydrolysable and biodegradable copolyurethanes derived from L-leucine cyclodipeptide and different molecular weights of PEG in TBAB under microwave irradiation", Macromolecular Research (2012), 20(9), pp. 902-911 (Year: 2012).*

Rafiemanzelat et al. "Synthesis pf new poly(ether-urethane-urea)s based on amino acid cyclopeptide and PEG: study of their environmental degradation", Amino Acids (2013), 44, pp. 449-459 (Year: 2013).*

\* cited by examiner

*Primary Examiner* — Michael M. Bernshteyn
(74) *Attorney, Agent, or Firm* — Thoburn Dunlap

(57) ABSTRACT

The thermoplastic polyurethane (TPU) compositions described herein have biodegradable and/or bioabsorbable hard and soft segments. The TPU hard segment can be formed from a polyisocyanate and a 2,5-substituted diketopiperazine.

27 Claims, No Drawings

BIODEGRADABLE AND/OR BIOABSORBABLE THERMOPLASTIC POLYURETHANES

CROSS REFERENCE TO RELATED APPLICATION

This application is a continuation application of U.S. application Ser. No. 16/088,849 filed on Sep. 27, 2018 which claims priority from U.S. Provisional Application Ser. No. 62/315,793 filed on Mar. 31, 2016.

FIELD OF THE INVENTION

There is provided herein thermoplastic polyurethane (TPU) compositions having biodegradable and/or bioabsorbable hard and soft segments.

BACKGROUND

Thermoplastic polyurethanes (TPUs) are a widely used class of polymer with specific physical and chemical properties which make them particularly suitable for in vivo applications. Conventional TPUs are among biomaterials not intended to degrade, but are susceptible to hydrolytic, oxidative and enzymatic degradation in vivo. Such degradation can be utilized to design biodegradable TPUs.

While thermoplastic polyurethanes have many mechanical properties which make them attractive for biomedical applications, degradation of the polymer presents challenges. It is known that degradation of the TPU soft segment can be achieved by appropriate selection of the soft segment chemistry. Frequently utilized biodegradable TPU soft segments include poly(ε-caprolactone), poly(lactic acid), polyglycolic acid and poly(ethylene glycol) polyols. Hard segment degradation is more of a challenge owing to the urethane bonds being less susceptible to degradation. Hard segment modification has focused on varying diisocyanate structures and chain extenders. These modifications, however, often lead to inferior mechanical properties of the TPUs.

Thus, it would be desirable to provide a thermoplastic polyurethane composition that is biodegradable and/or bioabsorbable in bodily environments without degrading to toxic byproducts, while maintaining favorable mechanical properties in bodily environments.

SUMMARY

The disclosed technology provides a thermoplastic polyurethane (TPU) composition that includes a bioabsorbable thermoplastic polyurethane, including the reaction product of a polydiisocyanate component; a polyol component including a polyester; and at least one chain extender component comprising a cyclic dimer of an amino acid having a side chain containing a function group comprising —OH, —COOH, —NH, —NH₂ or —SH.

The disclosed technology further provides the bioabsorbable thermoplastic polyurethane in which the polydiisocyanate component includes an aliphatic or aromatic diisocyanate.

The disclosed technology further provides the bioabsorbable thermoplastic polyurethane in which the aliphatic diisocyanate includes H12MDI, HDI, HMDI, IPDI, LDI, BDI, PDI, CHDI, TODI, NDI, or combinations thereof.

The disclosed technology further provides the bioabsorbable thermoplastic polyurethane in which the aromatic diisocyanate includes MDI, TDI, XDI or combinations thereof.

The disclosed technology further provides the bioabsorbable thermoplastic polyurethane in which the polyol component is a polyester polyol including poly(L-lactide) (PLA), polglycolide (PGA), or polycaprolactone (PCL) or combinations thereof.

The disclosed technology further provides the bioabsorbable thermoplastic polyurethane in which the polyol component is a polyether polyol including poly(propylene glycol), poly(ethylene glycol), poly(tetramethylene ether glycol), or combinations thereof.

The disclosed technology further provides the bioabsorbable thermoplastic polyurethane in which the chain extender component includes a cyclic dimer of glutamic acid, serine, lysine, glycine, aspartic acid, cysteine, arginine, histidine, glutamine, asparagine, threonine, hydroxyproline, tryptophan or tyrosine and optical isomers thereof.

The disclosed technology further provides the bioabsorbable thermoplastic polyurethane further including an additional chain extender.

The disclosed technology further provides the bioabsorbable thermoplastic polyurethane in which the additional chain extender comprises at least one diol chain extender of the general formula HO—(CH₂)ₓ—OH wherein x is an integer from 2 to 6.

The disclosed technology further provides the bioabsorbable thermoplastic polyurethane in which the at least one diol chain extender comprises 1,4-butane diol.

The disclosed technology further provides a bioabsorbable thermoplastic polyurethane, comprising the reaction product of a polydiisocyanate; a substituted 2,5-diketopiperazine of Formula 2:

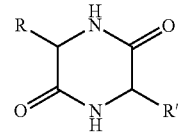

wherein:
R and R' are the side chain of an amino acid having a side chain containing a function group comprising —OH, —COOH, —NH, —NH₂ or —SH; and a polyol component.

The disclosed technology further provides the bioabsorbable thermoplastic polyurethane in which the substitution is a symmetrical or asymmetrical substitution.

The disclosed technology further provides the bioabsorbable thermoplastic polyurethane in which the substituted 2,5-diketopiperazine is present in an amount from 5 wt % to 45 wt % of the total weight of the thermoplastic polyurethane composition.

The disclosed technology further provides the bioabsorbable thermoplastic polyurethane in which the amino acid includes glutamic acid, serine, lysine, glycine, aspartic acid, cysteine, arginine, histidine, glutamine, asparagine, threonine, hydroxyproline, tyrosine, tryptophan, or optical isomers thereof.

The disclosed technology further provides the bioabsorbable thermoplastic polyurethane in which R and R' are the side chains of tyrosine.

The disclosed technology further provides the bioabsorbable thermoplastic polyurethane in R and R' are the side chains of lysine.

The disclosed technology further provides the bioabsorbable thermoplastic polyurethane in which R and R' are the side chains of serine.

The disclosed technology further provides the bioabsorbable thermoplastic polyurethane in which R and R' are the side chains of hydroxyproline.

The disclosed technology further provides the bioabsorbable thermoplastic polyurethane in which R and R' are the side chains of glutamic acid.

The disclosed technology further provides the bioabsorbable thermoplastic polyurethane in which R and R' are the side chains of glycine.

The disclosed technology further provides the bioabsorbable thermoplastic polyurethane in which R and R' are the side chains of aspartic acid.

The disclosed technology further provides the bioabsorbable thermoplastic polyurethane in which R and R' are the side chains of cysteine.

The disclosed technology further provides the bioabsorbable thermoplastic polyurethane in which R and R' are the side chains of arginine.

The disclosed technology further provides the bioabsorbable thermoplastic polyurethane in which R and R' are the side chains of histidine.

The disclosed technology further provides the bioabsorbable thermoplastic polyurethane in which R and R' are the side chains of glutamine.

The disclosed technology further provides the bioabsorbable thermoplastic polyurethane in which R and R' are the side chains of threonine.

The disclosed technology further provides the bioabsorbable thermoplastic polyurethane in which R and R' are the side chains of asparagine.

The disclosed technology further provides the bioabsorbable thermoplastic polyurethane in which R and R' are the side chains of tryptophan.

The disclosed technology further provides a method of making a bioabsorbable thermoplastic polyurethane including the step of reacting a polydiisocyanate component, a polyol component and at least one chain extender component including a cyclic dimer of an amino acid having a side chain containing a functional group comprising —OH, —COOH, —NH, —NH$_2$, or —SH.

DETAILED DESCRIPTION

Various preferred features and embodiments will be described below by way of non-limiting illustration.

The disclosed technology provides a thermoplastic polyurethane (TPU) composition that includes the reaction product of: a) a polyisocyanate component that includes at least a first and a second linear aliphatic diisocyanate; b) a polyol component that includes at least one polyester polyol; and c) a chain extender component that includes a cyclic dimer of an amino acid.

The polyisocyanate

The TPU compositions described herein are made using: (a) a polyisocyanate component, which includes at least one aliphatic diisocyanate.

Suitable polyisocyanates include aromatic diisocyanates, aliphatic diisocyanates, or combinations thereof. In some embodiments, the polyisocyanate component includes one or more aromatic diisocyanates. In some embodiments, the polyisocyanate component is essentially free of, or even completely free of, aliphatic diisocyanates. In other embodiments, the polyisocyanate component includes one or more aliphatic diisocyanates. In some embodiments, the polyisocyanate component is essentially free of, or even completely free of, aromatic diisocyanates.

Examples of useful polyisocyanates include aromatic diisocyanates such as 4,4'-methylenebis(phenyl isocyanate) (MDI), m-xylene diisocyanate (XDI), phenylene-1,4-diisocyanate, naphthalene-1,5-diisocyanate, and toluene diisocyanate (TDI); as well as aliphatic diisocyanates such as hexamethylene diisocyanate (HDI) 4,4'-Diisocyanato dicyclohexylmethane (HMDI), isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), 3,3'-dimethyl-4,4'-biphenylene diisocyanate (TODI), 1,5-naphthalene diisocyanate (NDI), and dicyclohexylmethane-4,4'-diisocyanate (H12MDI). Mixtures of two or more polyisocyanates may be used. In some embodiments, the polyisocyanate is MDI and/or H12MDI. In some embodiments, the polyisocyanate includes MDI. In some embodiments, the polyisocyanate includes H12MDI.

In some embodiments, the mixtures of two or more polyisocyanates may be used.

In some embodiments, the thermoplastic polyurethane is prepared with a polyisocyanate component that includes H12MDI. In some embodiments, the thermoplastic polyurethane is prepared with a polyisocyanate component that consists essentially of H12MDI. In some embodiments, the thermoplastic polyurethane is prepared with a polyisocyanate component that consists of H12MDI.

In some embodiments, the polyisocyanate used to prepare the TPU and/or TPU compositions described herein is at least 50%, on a weight basis, a cycloaliphatic diisocyanate. In some embodiments, the polyisocyanate includes an α,ω-alkylene diisocyanate having from 5 to 20 carbon atoms.

In some embodiments, the polyisocyanate used to prepare the TPU and/or TPU compositions described herein includes hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, or combinations thereof.

In some embodiments, the described TPU is prepared with a polyisocyanate component that includes HDI, H12MDI, LDI, IPDI, or combinations thereof. In some embodiments, the TPU is prepared with a polyisocyanate component consists of, or even consists essentially of H12MDI.

In still other embodiments, the polyisocyanate component is essentially free of (or even completely free of) any non-linear aliphatic diisocyanates, any aromatic diisocyanates, or both. In still other embodiments, the polyisocyanate component is essentially free of (or even completely free of) any polyisocyanate other than the linear aliphatic diisocyanates described above.

The polyol Component

The TPU compositions described herein are made using: (b) a polyol component comprising at least one polyol component.

Polyols include polyether polyols, polyester polyols, polycarbonate polyols, polysiloxane polyols, and combinations thereof.

Suitable polyols, which may also be described as hydroxyl terminated intermediates, when present, may include one or more hydroxyl terminated polyesters, one or more hydroxyl terminated polyethers, one or more hydroxyl terminated polycarbonates, one or more hydroxyl terminated polysiloxanes, or mixtures thereof.

Suitable hydroxyl terminated polyester intermediates include linear polyesters having a number average molecular weight (Mn) of from about 500 to about 10,000, from about 700 to about 5,000, or from about 700 to about 4,000, and generally have an acid number less than 1.3 or less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycols described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

The polyol component may also include one or more polycaprolactone polyester polyols. The polycaprolactone polyester polyols useful in the technology described herein include polyester diols derived from caprolactone monomers. The polycaprolactone polyester polyols are terminated by primary hydroxyl groups. Suitable polycaprolactone polyester polyols may be made from ε-caprolactone and a bifunctional initiator such as diethylene glycol, 1,4-butanediol, or any of the other glycols and/or diols listed herein. In some embodiments, the polycaprolactone polyester polyols are linear polyester diols derived from caprolactone monomers.

Useful examples include CAPA™ 2202A, a 2,000 number average molecular weight (Mn) linear polyester diol, and CAPA™ 2302A, a 3,000 Mn linear polyester diol, both of which are commercially available from Perstorp Polyols Inc. These materials may also be described as polymers of 2-oxepanone and 1,4-butanediol.

The polycaprolactone polyester polyols may be prepared from 2-oxepanone and a diol, where the diol may be 1,4-butanediol, diethylene glycol, monoethylene glycol, 1,6-hexanediol, 2,2-dimethyl-1,3-propanediol, or any combination thereof. In some embodiments, the diol used to prepare the polycaprolactone polyester polyol is linear. In some embodiments, the polycaprolactone polyester polyol has a number average molecular weight from 500 to 10,000, or from 500 to 3,000, or 600 to 1,000, or 1,000 to 3,000 or from 500, or 600, or from 1,000 or even 2,000 to 4,000 or even 3,000, or even about 2,000.

Suitable hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. In some embodiments, the polyether intermediate includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the described compositions. Typical copolyethers include the reaction product of THF and ethylene oxide or THF and propylene oxide. These are available from BASF as PolyTHF® B, a block copolymer, and PolyTHF® R, a random copolymer. The various polyether intermediates generally have a number average molecular weight (Mn) as determined by assay of the terminal functional groups which is an average molecular weight greater than about 700, such as from about 700 to about 10,000, from about 1,000 to about 5,000, or from about 1,000 to about 2,500. In some embodiments, the polyether intermediate includes a blend of two or more different molecular weight polyethers, such as a blend of 2,000 Mn and 1,000 Mn PTMEG.

Suitable hydroxyl terminated polycarbonates include those prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms. Suitable diols include aliphatic diols containing 4 to 12 carbon atoms such as 1,4-butanediol, 1,5-pentanediol, neopentyl glycol, 1,6-hexanediol, 2,2,4-trimethyl-1,6-hexanediol, 1,10-decanediol, hydrogenated dilinoleylglycol, hydrogenated dioleylglycol, 3-methyl-1,5-pentanediol; and cycloaliphatic diols such as 1,3-cyclohexanediol, 1,4-dimethylolcyclohexane, 1,4-cyclohexanediol-, 1,3-dimethylolcyclohexane-, 1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethyl carbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenylcarbonate, ditolylcarbonate, and dinaphthylcarbonate.

Suitable polysiloxane polyols include α-ω-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

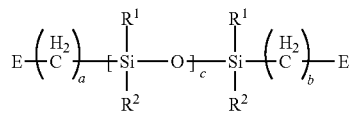

in which: each R1 and R2 are independently a 1 to 4 carbon atom alkyl group, a benzyl, or a phenyl group; each E is OH or NHR$^3$ where R$^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is NHR$^3$. In the hydroxyl-containing polysiloxanes, at least one of the E groups is OH. In some embodiments, both R$^1$ and R$^2$ are methyl groups.

Suitable examples include α,ω-hydroxypropyl terminated poly(dimethysiloxane) and α,ω-amino propyl terminated poly(dimethysiloxane), both of which are commercially available materials. Further examples include copolymers of the poly(dimethysiloxane) materials with a poly(alkylene oxide).

The polyol component, when present, may include poly(ethylene glycol), poly(tetramethylene ether glycol), poly(trimethylene oxide), ethylene oxide capped poly(propylene glycol), poly(butylene adipate), poly(ethylene adipate), poly(hexamethylene adipate), poly(tetramethylene-co-hexamethylene adipate), poly(3-methyl-1,5-pentamethyl ene adipate), polycaprolactone diol, poly(hexamethylene carbonate) glycol, poly(pentamethylene carbonate) glycol, poly(trimethylene carbonate) glycol, dimer fatty acid based polyester polyols, vegetable oil based polyols, or any combination thereof.

Examples of dimer fatty acids that may be used to prepare suitable polyester polyols include Priplast™ polyester glycols/polyols commercially available from Croda and Radia® polyester glycols commercially available from Oleon.

In some embodiments, the polyol component includes a polyether polyol, a polycarbonate polyol, a polycaprolactone polyol, or any combination thereof.

In some embodiments, the polyol component includes a polyether polyol. In some embodiments, the polyol component is essentially free of or even completely free of polyester polyols. In some embodiments, the polyol component used to prepare the TPU is substantially free of, or even completely free of polysiloxanes.

In some embodiments, the polyol component includes ethylene oxide, propylene oxide, butylene oxide, styrene oxide, poly(tetramethylene ether glycol), poly(propylene glycol), poly(ethylene glycol), copolymers of poly(ethylene glycol) and poly(propylene glycol), epichlorohydrin, and the like, or combinations thereof. In some embodiments the polyol component includes poly(tetramethylene ether glycol).

In other embodiments, the polyol component is essentially free of (or even completely free of) any polyether polyols, polycarbonate polyols, polysiloxane polyols, or all of the above.

Suitable polyamide oligomers, including telechelic polyamide polyols, are not overly limited and include low molecular weight polyamide oligomers and telechelic polyamides (including copolymers) that include N-alkylated amide groups in the backbone structure. Telechelic polymers are macromolecules that contain two reactive end groups. Amine terminated polyamide oligomers can be useful as polyols in the disclosed technology. The term polyamide oligomer refers to an oligomer with two or more amide linkages, or sometimes the amount of amide linkages will be specified. A subset of polyamide oligomers are telechelic polyamides. Telechelic polyamides are polyamide oligomers with high percentages, or specified percentages, of two functional groups of a single chemical type, e.g. two terminal amine groups (meaning either primary, secondary, or mixtures), two terminal carboxyl groups, two terminal hydroxyl groups (again meaning primary, secondary, or mixtures), or two terminal isocyanate groups (meaning aliphatic, aromatic, or mixtures). Ranges for the percent difunctional that can meet the definition of telechelic include at least 70, 80, 90 or 95 mole % of the oligomers being difunctional as opposed to higher or lower functionality. Reactive amine terminated telechelic polyamides are telechelic polyamide oligomers where the terminal groups are both amine types, either primary or secondary and mixtures thereof, i.e. excluding tertiary amine groups.

In one embodiment, the telechelic oligomer or telechelic polyamide will have a viscosity measured by a Brookfield circular disc viscometer with the circular disc spinning at 5 rpm of less than 100,000 cps at a temperature of 70° C., less than 15,000 or 10,000 cps at 70° C., less than 100,000 cps at 60 or 50° C., less than 15,000 or 10,000 cps at 60° C.; or less that 15,000 or 10,000 cps at 50° C. These viscosities are those of neat telechelic prepolymers or polyamide oligomers without solvent or plasticizers. In some embodiments, the telechelic polyamide can be diluted with solvent to achieve viscosities in these ranges.

In some embodiments, the polyamide oligomer is a species below 20,000 g/mole molecular weight, e.g., often below 10,000; 5,000; 2,500; or 2000 g/mole, that has two or more amide linkages per oligomer. The telechelic polyamide has molecular weight preferences identical to the polyamide oligomer. Multiple polyamide oligomers or telechelic polyamides can be linked with condensation reactions to form polymers, generally above 100,000 g/mole.

Generally, amide linkages are formed from the reaction of a carboxylic acid group with an amine group or the ring opening polymerization of a lactam, e.g., where an amide linkage in a ring structure is converted to an amide linkage in a polymer. In one embodiment, a large portion of the amine groups of the monomers are secondary amine groups or the nitrogen of the lactam is a tertiary amide group. Secondary amine groups form tertiary amide groups when the amine group reacts with carboxylic acid to form an amide. For the purposes of this disclosure, the carbonyl group of an amide, e.g., as in a lactam, will be considered as derived from a carboxylic acid group. The amide linkage of a lactam is formed from the reaction of carboxylic group of an aminocarboxylic acid with the amine group of the same aminocarboxylic acid. In one embodiment, we want less than 20, 10 or 5 mole percent of the monomers used in making the polyamide to have functionality in polymerization of amide linkages of 3 or more.

The polyamide oligomers and telechelic polyamides of this disclosure can contain small amounts of ester linkages, ether linkages, urethane linkages, urea linkages, etc. if the additional monomers used to form these linkages are useful to the intended use of the polymers.

As earlier indicated many amide forming monomers create on average one amide linkage per repeat unit. These include diacids and diamines when reacted with each other, aminocarboxylic acids, and lactams. These monomers, when reacted with other monomers in the same group, also create amide linkages at both ends of the repeat units formed. Thus, we will use both percentages of amide linkages and mole percent and weight percentages of repeat units from amide forming monomers. Amide forming monomers will be used to refer to monomers that form on average one amide linkage per repeat unit in normal amide forming condensation linking reactions.

In one embodiment, at least 10 mole percent, or at least 25, 45 or 50, and or even at least 60, 70, 80, 90, or 95 mole % of the total number of the heteroatom containing linkages connecting hydrocarbon type linkages are characterized as being amide linkages. Heteroatom linkages are linkages such as amide, ester, urethane, urea, ether linkages where a heteroatom connects two portions of an oligomer or polymer that are generally characterized as hydrocarbons (or having carbon to carbon bond, such as hydrocarbon linkages). As the amount of amide linkages in the polyamide increase the amount of repeat units from amide forming monomers in the polyamide increases. In one embodiment, at least 25 wt. %, or at least 30, 40, 50, or even at least 60, 70, 80, 90, or 95 wt. % of the polyamide oligomer or telechelic polyamide is repeat units from amide forming monomers, also identified as monomers that form amide linkages at both ends of the repeat unit. Such monomers include lactams, aminocarboxylic acids, dicarboxylic acid and diamines. In one embodiment, at least 50, 65, 75, 76, 80, 90, or 95 mole percent of the amide linkages in the polyamide oligomer or telechelic polyamine are tertiary amide linkages.

The percent of tertiary amide linkages of the total number of amide linkages was calculated with the following equation:

$$\text{Tertiary amide linkage \%} = \frac{\sum_{i=1}^{n} (w_{tertN,i} \times n_i)}{\sum_{i=1}^{n} (w_{totalN,i} \times n_i)} \times 100$$

where: n is the number of monomers; the index i refers to a certain monomer; $W_{tertN}$ is the average number nitrogen atoms in a monomer that form or are part of tertiary amide linkages in the polymerizations, (note: end-group forming amines do not form amide groups during the polymerizations and their amounts are excluded from $w_{tertN}$); $w_{totalN}$ is the average number nitrogen atoms in a monomer that form or are part of tertiary amide linkages in the polymerizations (note: the end-group forming amines do not form amide groups during the polymerizations and their amounts are excluded from $w_{totalN}$); and $n_i$ is the number of moles of the monomer with the index i.

The percent of amide linkages of the total number of all heteroatom containing linkages (connecting hydrocarbon linkages) was calculated by the following equation:

$$\text{Amide linkage \%} = \frac{\sum_{i=1}^{n} (w_{totalN,i} \times n_i)}{\sum_{i=1}^{n} (w_{totalS,i} \times n_i)} \times 100$$

where: $w_{totalS}$ is the sum of the average number of heteroatom containing linkages (connecting hydrocarbon linkages) in a monomer and the number of heteroatom containing linkages (connecting hydrocarbon linkages) forming from that monomer by the reaction with a carboxylic acid bearing monomer during the polyamide polymerizations; and all other variables are as defined above. The term "hydrocarbon linkages" as used herein are just the hydrocarbon portion of each repeat unit formed from continuous carbon to carbon bonds (i.e. without heteroatoms such as nitrogen or oxygen) in a repeat unit.

In some embodiments, the amide or tertiary amide forming monomers include dicarboxylic acids, diamines, aminocarboxylic acids and lactams. Sutiable dicarboxylic acids are where the alkylene portion of the dicarboxylic acid is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion). These include dimer fatty acids, hydrogenated dimer acid, sebacic acid, etc.

Suitable diamines include those with up to 60 carbon atoms, optionally including one heteroatom (besides the two nitrogen atoms) for each 3 or 10 carbon atoms of the diamine and optionally including a variety of cyclic, aromatic or heterocyclic groups providing that one or both of the amine groups are secondary amines.

Such diamines include Ethacure™ 90 from Albermarle (supposedly a N,N'-bis(1,2,2-trimethylpropyl)-1,6-hexanediamine); Clearlink™ 1000 from Dorfketal, or Jefflink™ 754 from Huntsman; N-methylaminoethanol; dihydroxy terminated, hydroxyl and amine terminated or diamine terminated poly(alkyleneoxide) where the alkylene has from 2 to 4 carbon atoms and having molecular weights from about 40 or 100 to 2000; N,N'-diisopropyl-1,6-hexanediamine; N,N'-di(sec-butyl) phenylenediamine; piperazine; homopiperazine; and methyl-piperazine.

Suitable lactams include straight chain or branched alkylene segments therein of 4 to 12 carbon atoms such that the ring structure without substituents on the nitrogen of the lactam has 5 to 13 carbon atoms total (when one includes the carbonyl) and the substituent on the nitrogen of the lactam (if the lactam is a tertiary amide) is an alkyl group of from 1 to 8 carbon atoms and more desirably an alkyl group of 1 to 4 carbon atoms. Dodecyl lactam, alkyl substituted dodecyl lactam, caprolactam, alkyl substituted caprolactam, and other lactams with larger alkylene groups are preferred lactams as they provide repeat units with lower Tg values. Aminocarboxylic acids have the same number of carbon atoms as the lactams. In some embodiments, the number of carbon atoms in the linear or branched alkylene group between the amine and carboxylic acid group of the aminocarboxylic acid is from 4 to 12 and the substituent on the nitrogen of the amine group (if it is a secondary amine group) is an alkyl group with from 1 to 8 carbon atoms, or from 1 or 2 to 4 carbon atoms.

In one embodiment, desirably at least 50 wt. %, or at least 60, 70, 80 or 90 wt. % of said polyamide oligomer or telechelic polyamide comprise repeat units from diacids and diamines of the structure of the repeat unit being:

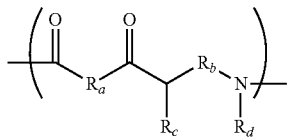

wherein: $R_a$ is the alkylene portion of the dicarboxylic acid and is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion); and $R_b$ is a direct bond or a linear or branched (optionally being or including cyclic, heterocyclic, or aromatic portion(s)) alkylene group (optionally containing up to 1 or 3 heteroatoms per 10 carbon atoms) of 2 to 36 or 60 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being an alkyl group of 1 or 2 to 4 carbon atoms.

In one embodiment, desirably at least 50 wt. %, or at least 60, 70, 80 or 90 wt. % of said polyamide oligomer or telechelic polyamide comprise repeat units from lactams or amino carboxylic acids of the structure:

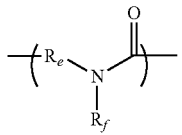

Repeat units can be in a variety of orientations in the oligomer derived from lactams or amino carboxylic acid depending on initiator type, wherein each $R_e$ independently is linear or branched alkylene of 4 to 12 carbon atoms and each $R_f$ independently is a linear or branched alkyl of 1 to 8, more desirably 1 or 2 to 4, carbon atoms.

In some embodiments, the telechelic polyamide polyols include those having (i) repeat units derived from polymerizing monomers connected by linkages between the repeat units and functional end groups selected from carboxyl or primary or secondary amine, wherein at least 70 mole percent of telechelic polyamide have exactly two functional end groups of the same functional type selected from the group consisting of amino or carboxylic end groups; (ii) a polyamide segment comprising at least two amide linkages characterized as being derived from reacting an amine with a carboxyl group, and said polyamide segment comprising repeat units derived from polymerizing two or more of monomers selected from lactams, aminocarboxylic acids, dicarboxylic acids, and diamines; (iii) wherein at least 10 percent of the total number of the heteroatom containing linkages connecting hydrocarbon type linkages are characterized as being amide linkages; and (iv) wherein at least 25 percent of the amide linkages are characterized as being tertiary amide linkages.

In some embodiments, the thermoplastic polyurethane is prepared with a polyol component that consists essentially of a polyester polyol. In some embodiments, the polyester polyol is polycaprolactone.

The Chain Extender

The TPU compositions described herein are made using: (c) a chain extender component that includes a cyclic dimer of an amino acid, also referred to herein as a 2,5-substituted diketopiperazine or a cyclic dipeptide.

By "side chain" of an amino acid is meant that portion of the amino acid:

NH$_2$—CH—COOH
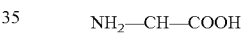

attached to the common backbone of all of the amino acids listed below.

In some embodiments, the amino acids utilized for preparation of the diketopiperzines of the invention may be naturally occurring or non-naturally occurring, and include tyrosine, serine, lysine, hydroxyproline, glutamic acid, glycine, aspartic acid, cysteine, threonine, arginine, histidine, glutamine, asparagine, tryptophan and optical isomers of any of the foregoing. In some embodiments, the cyclic dipeptide may be further modified to include increased ester or amide content.

In some embodiments, the 2,5-substituted diketoperazine can have the following Formula (I):

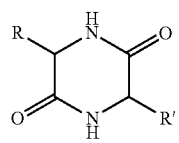

wherein R and R' are the side chain of an amino acid containing a functional group including —OH, —COOH, —NH, —NH$_2$ or —SH, and R and R' may be the same or different.

General methods for synthesis and preparation of diketopiperazines are disclosed in U.S. Pat. Nos. 5,352,461; 5,503,852; 6,071,497; 6,331,318; 6,428,771 and U.S. Patent Application No. 20060040953 each incorporated herein by reference in their entirety. Diketopiperzines can be formed by cyclodimerization of amino acid ester derivatives as described by Katchalski, et al., *J. Amer. Chem Soc.*, 68, 879-880 (1946), by cyclization of dipeptide ester derivatives, or by thermal dehydration of amino acid derivatives and high boiling solvents as described by Kopple, et al., *J. Org. Chem.*, 33 (2), 862-864 (1968).

The chain extender component may be present, in some embodiments, in an amount from about 5 wt % to about 45 wt.

In some embodiments, the TPU compositions are co-extended and are made using an additional chain extender component that includes at least one diol chain extender of the general formula HO—$(CH_2)_x$—OH wherein x is an integer from 2 to 6 or even from 4 to 6. In other embodiments, x is the integer 4. Useful additional coextenders include diol chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy)phenyl] propane (HEPP), heptanediol, nonanediol, dodecanediol, ethylenediamine, butanediamine, hexamethylenediamine, and hydroxyethyl resorcinol (HER), and the like, as well as mixtures thereof. In some embodiments, the chain extender includes BDO, HDO, or a combination thereof. In some embodiments, the chain extender includes BDO. Other glycols, such as aromatic glycols could be used, but in some embodiments the TPUs described herein are essentially free of or even completely free of such materials, or a combination thereof.

In some embodiments, the additional chain extender includes a cyclic chain extender. Suitable examples include CHDM, HEPP, HER, and combinations thereof. In some embodiments, the additional chain extender may include an aromatic cyclic chain extender, for example HEPP, HER, or a combination thereof. In some embodiments, the additional chain extender may include an aliphatic cyclic chain extender, for example CHDM. In some embodiments, the additional chain extender is substantially free of, or even completely free of aromatic chain extenders, for example aromatic cyclic chain extenders. In some embodiments, the additional chain extender is substantially free of, or even completely free of polysiloxanes.

The Thermoplastic Polyurethane Compositions

The compositions described herein are TPU compositions. These TPU are prepared by reacting: a) the polyisocyanate component described above, that includes an aliphatic diisocyanate; b) the polyol component described above, that includes a polyester polyol; and c) the chain extender component that includes a cyclic dimer of an amino acid.

In some embodiments, the TPU compositions of the invention have a hard segment content of 10 to 50 percent by weight, where the hard segment content is the portion of the TPU derived from the polyisocyanate component and the chain extender component (the hard segment content of the TPU may be calculated by adding the weight percent content of chain extender and polyisocyanate in the TPU and dividing that total by the sum of the weight percent contents of the chain extender, polyisocyanate, and polyol in the TPU). In other embodiments, the hard segment content is at least 10, or at least 15, or from 10 to 60, or from 15 to 45 percent by weight.

The described compositions include the TPU materials described above and also TPU compositions that include such TPU materials and one or more additional components. These additional components include other polymeric materials that may be blended with the TPU described herein. These additional components also include one or more additives that may be added to the TPU, or blend containing the TPU, to impact the properties of the composition.

The TPU described herein may also be blended with one or more other polymers. The polymers with which the TPU described herein may be blended are not overly limited. In some embodiments, the described compositions include a two or more of the described TPU materials. In some embodiments, the compositions include at least one of the described TPU materials and at least one other polymer, which is not one of the described TPU materials. In some embodiments, the described blends will have the same combination of properties described above for the TPU composition. In other embodiments, the TPU composition will of course have the described combination of properties, while the blend of the TPU composition with one or more of the other polymeric materials described above may or may not.

Polymers that may be used in combination with the TPU materials described herein also include more conventional TPU materials such as non-caprolactone polyester-based TPU, polyether-based TPU, or TPU containing both non-caprolactone polyester and polyether groups. Other suitable materials that may be blended with the TPU materials described herein include polycarbonates, polyolefins, styrenic polymers, acrylic polymers, polyoxymethylene polymers, polyamides, polyphenylene oxides, polyphenylene sulfides, polyvinylchlorides, chlorinated polyvinyl chlorides, polylactic acids, or combinations thereof.

Polymers for use in the blends described herein include homopolymers and copolymers. Suitable examples include: (i) a polyolefin (PO), such as polyethylene (PE), polypropylene (PP), polybutene, ethylene propylene rubber (EPR), polyoxyethylene (POE), cyclic olefin copolymer (COC), or combinations thereof; (ii) a styrenic, such as polystyrene (PS), acrylonitrile butadiene styrene (ABS), styrene acrylonitrile (SAN), styrene butadiene rubber (SBR or HIPS), polyalphamethylstyrene, styrene maleic anhydride (SMA), styrene-butadiene copolymer (SBC) (such as styrene-butadiene-styrene copolymer (SBS) and styrene-ethylene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof; (iii) a thermoplastic polyurethane (TPU) other than those described above; (iv) a polyamide, such as Nylon™, including polyamide 6,6 (PA66), polyamide 1,1 (PA11), polyamide 1,2 (PA12), a copolyamide (COPA), or combinations thereof; (v) an acrylic polymer, such as polymethyl acrylate, polymethylmethacrylate, a methyl methacrylate styrene (MS) copolymer, or combinations thereof; (vi) a polyvinylchloride (PVC), a chlorinated polyvinylchloride (CPVC), or combinations thereof; (vii) a polyoxyemethylene, such as polyacetal; (viii) a polyester, such as polyethylene terephthalate (PET), polybutylene terephthalate (PBT), copolyesters and/or polyester elastomers (COPE) including polyether-ester block copolymers such as glycol modified polyethylene terephthalate (PETG), polylactic acid (PLA), polyglycolic acid (PGA), copolymers of PLA and PGA, or combinations thereof; (ix) a polycarbonate (PC), a polyphenylene sulfide (PPS), a polyphenylene oxide (PPO), or combinations thereof; or combinations thereof.

In some embodiments, these blends include one or more additional polymeric materials selected from groups (i), (iii), (vii), (viii), or some combination thereof. In some embodiments, these blends include one or more additional polymeric materials selected from group (i). In some embodiments, these blends include one or more additional polymeric materials selected from group (iii). In some embodiments, these blends include one or more additional polymeric materials selected from group (vii). In some embodiments, these blends include one or more additional polymeric materials selected from group (viii).

The additional additives suitable for use in the TPU compositions described herein are not overly limited. Suitable additives include pigments, UV stabilizers, UV absorbers, antioxidants, lubricity agents, heat stabilizers, hydrolysis stabilizers, cross-linking activators, flame retardants, layered silicates, radio opacifiers, such as barium sulfate, tungsten metal, non-oxide bismuth salts, fillers, colorants, reinforcing agents, adhesion mediators, impact strength modifiers, antimicrobials, and any combination thereof.

The TPU compositions described herein may also include additional additives, which may be referred to as a stabilizer. The stabilizers may include antioxidants such as phenolics, phosphites, thioesters, and amines, light stabilizers such as hindered amine light stabilizers and benzothiazole UV absorbers, and other process stabilizers and combinations thereof. In one embodiment, the preferred stabilizer is Irganox®-1010 from BASF and Naugard®-445 from Chemtura. The stabilizer is used in the amount from about 0.1 weight percent to about 5 weight percent, in another embodiment from about 0.1 weight percent to about 3 weight percent, and in another embodiment from about 0.5 weight percent to about 1.5 weight percent of the TPU composition.

Still further optional additives may be used in the TPU compositions described herein. The additives include colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents and combinations thereof.

All of the additives described above may be used in an effective amount customary for these substances. These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

The thermoplastic polyurethanes of the invention can be prepared by processes which are conventional in the art for the synthesis of polyurethane elastomers such as but not limited to a two-step, batch process or a one-shot technique. In a two-step process, a prepolymer intermediate is reacted with an excess amount of diisocyanate, followed by chain extending the same. In the batch process, the components, i.e., the diisocyanate(s), the polyol(s), and the chain extenders (s), as well as the catalyst(s) and any other additive(s), if desired, are introduced into a container, mixed, dispensed into trays and allowed to cure. The cured TPU can then be granulated and pelletized. The one-shot procedure is performed in an extruder, e.g. single screw, twin screw, wherein the formative components, introduced individually or as a mixture into the extruder, and reacted at a temperature generally in one embodiment from about 100° C. to about 300° C., and in another embodiment from about 150° C. to about 250° C., and even from about 150° C. to about 240° C.

One or more polymerization catalysts may be present during the polymerization reaction. Generally, any conventional catalyst can be utilized to react the diisocyanate with the polyol intermediates or the chain extender. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy) ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

The TPU materials described above may be prepared by a process that includes the step of: (I) reacting: a) the polyisocyanate component described above, that includes at least one aliphatic diisocyanate; b) the polyol component described above, that includes at least one polyester polyol; and c) the chain extender component described above that includes a substituted 2,5-diketopiperazine, as described above.

The process may further include the step of: (II) mixing the TPU composition of step (I) with one or more blend components, including one or more additional TPU materials and/or polymers, including any of those described above.

The process may further include the step of: (II) mixing the TPU composition of step (I) with one or more additional additives selected from the group consisting of pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, and antimicrobials.

The process may further include the step of: (II) mixing the TPU composition of step (I) with one or more blend components, including one or more additional TPU materials and/or polymers, including any of those described above, and/or the step of: (III) mixing the TPU composition of step (I) with one or more additional additives selected from the group consisting of pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, and antimicrobials.

The process may further include in step I of including a co-extender component that includes at least one diol chain extender of the general formula HO—$(CH_2)_x$—OH wherein x is an integer from 2 to 6.

The TPU materials and/or compositions described herein may be used in the preparation of one or more articles. The specific type of articles that may be made from the TPU materials and/or compositions described herein are not overly limited.

The invention further provides an article made with the TPU materials and/or compositions described herein. Examples include but are not limited to medical applications, as well as used in, personal care applications, pharmaceutical applications, health care product applications, or any other number of applications. In some embodiments, these articles are prepared by extruding, injection molding, or any combination thereof.

The amount of each chemical component described is presented exclusive of any solvent which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. For instance, metal ions (of, e.g., a flame retardant) can migrate to other acidic or anionic sites of other molecules. The products formed thereby, including the products formed upon employing the composition of the technology described herein in its intended use, may not be susceptible of easy description. Nevertheless, all such modifications and reaction products are included within the scope of the technology described herein; the technology described herein encompasses the composition prepared by admixing the components described above.

EXAMPLES

The technology described herein may be better understood with reference to the following non-limiting examples.

Materials

The materials are generally commercially available and were purchased from Sigma Aldrich, Fisher and Fluka and used as received unless stated otherwise, as indicated below.

| Name | Identity | Cmmercial source |
|---|---|---|
| Amino acids | | Alfa Aeser |
| HMDI | ,4'-Methylenebis(cyclohexyl isocyanate) | TCI |
| LDI | L-Lysine diisocyanate ethyl ester | Carbosynth |
| PCL2000 (dried under vacuum) | Polycaprolactone diol $M_n$~2000 | The Lubrizol Corporation |
| Amberlyst A21 (washed with MeOH and dried before use) | Free base resin | Sigma Aldrich |
| BDO (distilled over $CaH_2$) | 1,4-butane diol | Sigma Aldrich |
| DBU (distilled over $CaH_2$) | 1,8-Diazabicyclo[5.4.0]undec-7-ene | Sigma Aldrich |
| DMSO (dried over activated 3Å molecular sieves for minimum 24 hrs) | dimethylsulfoxide | Fisher |

$^1$H and $^{13}$C NMR spectra were obtained on a Bruker DPX-400 spectrometer (400 MHz) at 293 K. All chemical shifts were reported as δ in parts per million (ppm) and referenced to the residual solvent signal. FT-IR spectra were recorded on a Perkin Elmer FT-IR spectrometer and were obtained from a thin film of the product expressing the absorption maxima are expressed in wavenumbers (cm$^{-1}$). Gel permeation chromatography (GPC) was used to determine the number ($M_n$) and weight average molecular weight ($M_w$). GPC was conducted in dimethylformamide (DMF) using an Varian PL-GPC 50 system equipped with 2×PLgel 5 µL MIXED-D columns in series and either a differential refractive index (RI) detector or triple detection at a flow rate of 1.0 mL min at 50° C. The systems were calibrated against Varian Polymer Laboratories Easi-Vial linear poly(methyl methacrylate) (PMMA) or PMMA single standard $M_n$=73200 and respectively and analyzed by the software package Cirrus v3.3. Thermal gravimetric analysis (TGA) was conducted using a Mettler Toledo DSC1 star and a TGA/DSC star system between 25 and 550° C. at a heating rate of 10° C. min$^{-1}$ in a 40 µL aluminum crucible. Tensile data was obtained at ambient temperature by axially loading "dog-bones" (10 mm length) in a Tensiometric M100-1CT system with a load cell capacity of 1 kN and crosshead speed of 10 mm min$^{-1}$ with a premeasured grip-to-grip separation. All values reported were obtained from an average of 5 repeat specimens and the results were recorded using win-Test v4.3.2 software. Molten polymer samples were molded into "dog-bones" via compression moulding. The melting points were measured on a MPA100 OptiMelt. Percentage crystallinity was measured using wide angle X-ray diffraction measurements (WAXS) were carried out with a Panalytical X-Pert Pro MPD Diffractometer equipped with a focussing Johanson monochromator and using Cu K$_{α1}$ radiation (40 kV; 40 mA). Contact angles of polymer films evaporated on glass slides were measured on the Krüss DSA 100 Drop Shape Analyser using DSA3 software.

Synthesis of Dipeptide-based Monomers

Example 1

Cyclic Dipeptide of L-Tyrosine

The synthesis of the diketopiperazine of L-tyrosine is prepared as adapted from U.S. Pat. No. 7,709,639B2 to use as follows. L-Tyrosine (10 g, 5.52×10$^{-2}$ mol) and phosphorus pentoxide (0.71 g, 5.28×10$^{-3}$ mol) in m-cresol (20 mL) is stirred at 180-200° C. for 8 hours. After cooling to ambient temperature, the reaction is quenched with a mixture of deionized H$_2$O (10 mL) and MeOH (40 mL). The crude product precipitates from solution and the suspension is stirred for 1 hour. Additional MeOH (40 mL) is added, the precipitate is collected by filtration, washed with MeOH, deionized H$_2$O and MeOH. The product is recrystallized from glacial acetic acid (3 mL per g crude product) and then suspended in a 1:1 mixture of deionized H$_2$O and MeOH. The product is dried under vacuum to produce an off-white solid with a yield of 65%.

Example 2

Cyclic Dipeptide of L-serine

The diketopiperazine of L-serine is prepared in a two-step synthesis. Initially, the amino acid is converted into the methyl ester hydrochloride according to literature (*J. Org. Chem.* (1997), 62, 372-376). Acetyl chloride (20,41 g, $2.59 \times 10^{-1}$ mol) is added dropwise to ice-cold MeOH (343 mL) under stirring. After ten minutes, L-serine (10 g, $9.63 \times 10^{-2}$ mol) is added in one portion and the reaction mixture is allowed to reflux for 2.5 hours. The solvent is removed under vacuum and the raw product is recrystallized from MeOH (white solid, yield 100%). The synthesis of the diketopiperazine is then is conducted according to U.S. Pat. No. 4,871,736 (referred to J. Heterocycl. Chem. (1975), 12, 147-149). L-Serine methyl ester hydrochloride (10 g, $6.43 \times 10^{-2}$ mol) is dissolved in MeOH (100 mL) and flushed through a column of Amberlyst A21 free base resin (pre-treated with 100 ML of a saturated aqueous solution of $NaHCO_3$). Additional MeOH (50 mL) is flushed through the column. After removal of the solvent under vacuum, an oily liquid is obtained. The resulting free base dimerized over night at room temperature forming a crystalline solid. The crude product is recrystallized from deionized $H_2O$ and the product dried under vacuum to produce a white solid with a yield of 54%.

Example 3

Cyclic Dipeptide of L-glutamic acid

The diketopiperazine of L-glutamic acid is prepared in a two-step synthesis according to literature (J. Org. Chem. (2002), 67, 6, 1820-1826). First, pyroglutamic diketopiperazine is prepared by adding L-pyroglutamic acid (10 g, $7.75 \times 10^{-2}$ mol) to a 110° C. preheated stirred solution of acetic anhydride (45 mL) and pyridine (8 mL). After approximately 5 minutes the product starts to precipitate from the solution and heating is continued for a further 15 minutes. After cooling to room temperature, the product is collected by filtration and washed with cold MeOH. The product is purified by stirring in MeOH and deionized $H_2O$ and dried under vacuum (white solid, yield 82%). Second, the pyroglutamic diketopiperazine (5 g, $2.28 \times 10^{-2}$ mol) is added to ice-cold $H_2SO_4$ under stirring until complete dissolution. The solution iss cooled in an ice-bath and deionized water is slowly added under vigorous stirring. The product precipitates from the solution and is collected by filtration. The product is washed with hot MeOH and dried under vacuum to produce a white solid with a yield of 72%.

Example 4

Cyclic Dipeptide of L-lysine

The diketopiperazine of L-serine is prepared in a three-step synthesis. First, L-lysine is selectively EN-protected by a copper complex according to literature (*Biomacromolecules* (2010), 11, 11, 2949-2959). A solution of $CuSO_4 \times 5H_2O$ (6.92 g, $2.76 \times 10^{-2}$ mol) in deionised $H_2O$ (20 mL) is added to a solution of L-lysine hydrochloride (10 g, $5.54 \times 10^{-2}$ mol) and NaOH (4.34 g, $1.09 \times 10^{-1}$ mol) in deionized $H_2O$ (50 mL). $NaHCO_3$ (5.48 g, $7.14 \times 10^{-2}$ mol) is added after cooling the solution to 0° C. Thereafter, benzyl chloroformate (9 mL, $6,30 \times 10^{-2}$ mol) is added dropwise under nitrogen over a period of 20 minutes. The reaction mixture is allowed to stir for 1 hour at 0° C. and continued stirring for 17 hours at room temperature. The blue precipitate is collected by filtration and washed with deionized $H_2O$ (200 mL), acetone (100 mL) and $CHCl_3$ (50 mL) and then air dried. The blue copper complex is refluxed for 1.5 h in a suspension of EDTA (16.78 g, $5.74 \times 10^{-2}$ mol) in deionized $H_2O$ (120 mL). After cooling to room temperature, aqueous NaOH solution (2 M) is added to obtain a final pH of 7. The white solid is collected by filtration and washed successively with deionized $H_2O$. The product is recrystallized from deionized $H_2O$ (off-white solid, yield 85%). Second, the synthesis of the diketopiperazine was conducted according to U.S. Pat. No. 7,709,639B2. εN-Cbz-L-Lysine (5 g, $1.78 \times 10^{-2}$ mol) and phosphorus pentoxide (0.36 g, $2.64 \times 10^{-3}$ mol) in m-cresol (10 mL) is stirred at 165° C. for 1.5 hours. After cooling to ambient temperature, the reaction is quenched with a mixture of deionized $H_2O$ (5 mL) and MeOH (20 mL). The crude product precipitates from solution and the suspension is stirred for 1 hour. Additional MeOH (20 mL) is added, the precipitate is collected by filtration, washed with MeOH, deionized $H_2O$ and MeOH. The product is recrystallized from glacial acetic acid (3 mL per g crude product) and afterwards suspended in a 1:1 mixture of deionized $H_2O$ and MeOH. The product is dried under vacuum (yield 42%). Finally, the diketopiperazine hydrobromide is obtained by deprotection. εN-Cbz-Protected diketopiperazine (2 g, $3.81 \times 10^{-3}$ mol) is suspended in formic acid (2 mL) and hydrobromic acid solution (33% in acetic acid) (2 mL) is added dropwise. The starting material dissolves almost completely and with rapid evolution of gas (carbon dioxide) the product starts to precipitate from the solution. After 30 min, additional hydrobromic acid solution (2 mL) is added to complete the reaction. After a total reaction time of 2 hours, anhydrous ethyl ether (12 mL) is added to the reaction mixture to complete the precipitation. The product is successively washed with ethyl ether and dried under vacuum to produce a white solid with a yield of 54%.

Example 5

Cyclic dipeptide of 4-hydroxy-L-proline

The diketopiperazine of 4-hydroxy-L-proline is prepared in a two-step synthesis. First, the amino acid is converted into the methyl ester hydrochloride according to literature (Tetrahedron (1995), 51, 9, 2719-2728). Thionyl chloride (8.5 g, $7.60 \times 10^{-2}$ mol) is added dropwise to an ice-cooled suspension of 4-hydroxy-L-proline (10 g, $7.60 \times 10^{-2}$ mol) in MeOH (250 mL). The reaction solution is allowed to stir for 4 hours at room temperature. The solvent is removed under vacuum and traces of thionyl chloride are removed by co-evaporation with dichloromethane (white solid, yield 100%). Second, the synthesis of the diketopiperazine is adapted from the synthesis of the diketopiperazine of L-proline (or J. Heterocycl. Chem. (1975), 12, 147-149) to use as follows: Hydrazine monohydrate (2.75 g, $5.50 \times 10^{-2}$ mol) is added to a solution of 4-hydroxy-L-proline methyl ester hydrochloride (5 g, $2.75 \times 10^{-2}$ mol) in MeOH (13.75 mL). The mixture is allowed to stir for 16 hours at room temperature. The precipitate is collected by filtration and washed with MeOH.

The product is dried under vacuum to produce a white solid with a yield of 60%.

Polymer Synthesis

Polyurethanes are synthesized in either a 2-step or 1-pot reaction. In general, the first step of the 2-step reaction is the formation of the prepolymer by the reaction of PCL diol in DMSO (100% (v/v)) with an excess amount of diisocyanate. The reaction is conducted under a nitrogen flow at 60° C. using DBU (5 mol % of macrodiol) as catalyst. After 30 min the temperature is raised to 100° C. and the cyclic dipeptide extender (dissolved/suspended in hot DMSO (50% (w/v)) and tetrabutylammonium bromide (200% (w/w))) is added. The reaction is followed upon completion by FT-IR (1-3 h) indicated by the disappearance of the NCO signal. The viscous crude product mixture is poured into MeOH/H$_2$O (1:1) and after decanting the solvent the remaining DMSO in the polymer is removed under vacuum for 2 days at 50° C.

The 1-pot reaction is conducted at 100° C. by adding the diisocyanate to a mixture of PCL, cyclic dipeptide extender and DBU in DMSO using the same calculated equivalents amounts as in the 2-step reaction. The hard segment of the polyurethanes is calculated according to the following formula:

$$\%HS = \frac{100(R-1)(M_{di} + M_{da})}{[M_\varepsilon + R(M_{di}) + (R-1)(M_{da})]}$$

where,
R=ratio of diisocyanates divided by polyols;
M=molecular weight;
di=diisocyanate; da=diol; and
ε=polydiol.

The following Table 1 summarizes the formulation of the Samples, where Inventive Examples 1-8 are thermoplastic polyurethanes made with a cyclic dipeptide chain extender, and Inventive Examples 9-11 are thermoplastic polyurethanes which are co-extended with a 1,4-butane diol chain extender in addition to the cyclic dipeptide chain extender.

TABLE 1

Formulations of Examples

| Sample | Cyclic Dipeptide based amino acid | % BDO | Diisocyanate | % Hard Segment | M$_n$ (g/mol) | M$_w$ (g/mol) |
|---|---|---|---|---|---|---|
| Inv. Ex 1 | L-tyrosine | | H12MDI | 15 | 52366 | 154711 |
| Inv. Ex 2 | L-tyrosine | | H12MDI | 30 | 49472 | 80312 |
| Inv. Ex 3 | L-tyrosine | | H12MDI | 45 | 26522 | 48475 |
| Inv. Ex 4 | DL-tyrosine | | H12MDI | 30 | 28093 | 48815 |
| Inv. Ex 5 | L-serine | | | 30 | 32438 | 102962 |
| Inv. Ex 6 | 4-hydroxy-L-proline | | H12MDI | 30 | 54521 | 95909 |
| Inv. Ex 7 | L-glutamic acid | | H12MDI | 30 | 48273 | 83762 |
| Inv. Ex 8 | L-lysine | | H12MDI | 30 | 13824 | 21626 |
| Comp Ex 1 | | 100 | H12MDI | 30 | 15324 | 26484 |
| Inv. Ex 9 | L-tyrosine | 10 | H12MDI | 30 | 34433 | 62029 |
| Inv. Ex 10 | L-tyrosine | 5 | H12MDI | 30 | 33211 | 60166 |
| Inv. Ex 11 | L-tyrosine | 1.25 | H12MDI | 30 | 34117 | 61280 |

Each sample in Table 1 is tested to verify its mechanical properties (strength, modulus and elongation as measured by ASTM D412) and degradation onset and peak, as measured by thermogravimetric analysis (TGA).

TABLE 2

Physical Properties Results from Formulations of Table 1
4 Physical properties

| Sample | Degradation onset (° C.) | Degradation peak (° C.) | Tensile strength (MPa) | Young's Modulus (MPa) | Ultimate elongation (%) |
|---|---|---|---|---|---|
| Inv. Ex 1 | 385.56 | 442.27 | 11.74 | 31.20 | 655.19 |
| Inv. Ex 2 | 386.64 | 450.22 | 13.18 | 6.55 | 611.64 |
| Inv. Ex 3 | 376.84 | 437.70 | 10.93 | 64.91 | 212.26 |
| Inv. Ex 4 | 386.64 | 450.22 | 7.42 | 6.36 | 661.22 |
| Inv. Ex 5 | 207.68 339.38 | 327.79 385.39 | 10.89 | 4.81 | 484.18 |
| Inv. Ex 6 | 216.86 327.97 | 220.34 246.95 | 1.19 | 4.92 | 289.40 |
| Inv. Ex 7 | 189.26 340.61 | 251.97 389.11 | 9.99 | 7.58 | 619.42 |
| Inv. Ex 8* | 179.25 326.17 | 244.75 359.78 | — | — | — |
| Comp. Ex 1 | 347.21 | 409.64 | 7.28 | 68.26 | 23.40 |
| Inv. Ex 9 | 226.41 351.58 | 252.51 390.87 | 8.45 | 11.35 | 706.95 |
| Inv. Ex 10 | 225.08 343.11 | 436.11 | 9.40 | 11.06 | 788.71 |
| Inv. Ex 11 | 229.88 348.80 | 252.35 384.33 | 9.90 | 15.90 | 816.88 |

* = glass-like material

In Vitro Degradation

The raw TPU material is melted into small discs (Ø 1 cm, ~1 mm thickness) and all degradation studies are conducted in an incubator at 37° C. and 100 rpm. Sodium hydroxide (5 M NaOH) is used to accelerate the hydrolysis reaction. Phosphate buffered saline (PBS) at pH 7.4 is used to simulate in vivo conditions. The samples are removed at predetermined time points, rinsed with deionized water and left for minimum 1 hour drying at 100° C. before weighting. The mass loss is evaluated in triplicates determining the difference in mass between the final mass at specific time points and the initial mass expressed in percentage. PCL degradation in *Biomed. Mater.* (2008), 3, 1-15 was used as reference. Enzymes from animal sources (Sigma Aldrich) are used at an activity of 40 U/mL to simulate enzymatic degradation. The samples are removed at predetermined time points, rinsed with deionized water and the surface is wiped with tissue before weighting.

The accelerated degradation of cyclic dipeptide-based thermoplastic polyurethanes using different amino acids under basic conditions is shown in Table 3 below.

TABLE 3

Accelerated Degradation under basic conditions (5M NaOH)

| Time (h) | Inv Ex1 | Inv Ex2 | Inv Ex3 | Inv Ex5 | Inv Ex6 | Inv Ex7 | Inv Ex8 |
|---|---|---|---|---|---|---|---|
| | Remaining weight (%) | | | | | | |
| 0 | 100 | 100 | 100 | 100 | 100 | 100 | 100 |
| 1 | 100.50 | 100.53 | 99.07 | 100.25 | 75.04 | 96.98 | 80.62 |
| 3 | 99.11 | 98.68 | 43.90 | 93.51 | 44.07 | 90.27 | 72.48 |
| 5 | 96.50 | 93.19 | 37.55 | 92.99 | 16.95 | 84.70 | 55.88 |
| 8 | 96.35 | 89.42 | 16.54 | 72.08 | 2.36 | 72.30 | 15.98 |
| 12 | 91.53 | 77.37 | 4.22 | 55.81 | — | 63.60 | 7.21 |
| 24 | 79.08 | 65.21 | 4 | 42.12 | — | 42.38 | — |
| 48 | 65.74 | 53.87 | — | 28.66 | — | 27.53 | — |

TABLE 3-continued

Accelerated Degradation under basic conditions (5M NaOH)

| Time (h) | Inv Ex1 | Inv Ex2 | Inv Ex3 | Inv Ex5 | Inv Ex6 | Inv Ex7 | Inv Ex8 |
|---|---|---|---|---|---|---|---|
| | Remaining weight (%) | | | | | | |
| 72 | 60.67 | 46.29 | — | 21.95 | — | 16.00 | — |
| 96 | 41.42 | 37.26 | — | 13.51 | — | 8.01 | — |
| 144 | 28.77 | 30.85 | — | — | — | — | — |
| 192 | 11.24 | 13.42 | — | — | — | — | — |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the technology described herein can be used together with ranges or amounts for any of the other elements.

As described hereinafter the molecular weight of the materials described above have been determined using known methods, such as GPC analysis using polystyrene standards. Methods for determining molecular weights of polymers are well known. The methods are described for instance: (i) P. J. Flory, "Principles of star polymer Chemistry", Cornell University Press 91953), Chapter VII, pp 266-315; or (ii) "Macromolecules, an Introduction to star polymer Science", F. A. Bovey and F. H. Winslow, Editors, Academic Press (1979), pp 296-312. As used herein the weight average and number weight average molecular weights of the materials described are obtained by integrating the area under the peak corresponding to the material of interest, excluding peaks associated with diluents, impurities, uncoupled star polymer chains and other additives.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration. That is "consisting essentially of" permits the inclusion of substances that do not materially affect the basic and novel characteristics of the composition under consideration.

While certain representative embodiments and details have been shown for the purpose of illustrating the subject technology described herein, it will be apparent to those skilled in this art that various changes and modifications can be made therein without departing from the scope of the subject invention. In this regard, the scope of the technology described herein is to be limited only by the following claims.

The invention claimed is:

1. A thermoplastic polyurethane, comprising the reaction product of:
    a. a polydiisocyanate component;
    b. a polyol component; and
    c. at least one chain extender component comprising a cyclic dimer of an amino acid having a side chain containing a functional group comprising —OH, —COOH, —NH, —NH$_2$ or —SH.

2. The thermoplastic polyurethane of claim 1, wherein the polydiisocyanate component comprises an aliphatic or aromatic diisocyanate.

3. The thermoplastic polyurethane of claim 2, wherein the aliphatic diisocyanate is selected from the group consisting of dicyclohexylmethane-4,4'-diisocyanate, hexamethylene diisocyanate, 4,4'-diisocyanato dicyclohexylmethane, isophorone diisocyanate, lysine diisocyanate, 1,4-butane diisocyanate, PDI, 1,4-cyclohexyl diisocyanate, dicyclohexylmethane-4,4'-diisocyanate, and combinations thereof.

4. The thermoplastic polyurethane of claim 2, wherein the aromatic diisocyanate is selected from the group consisting of 4,4'-methylenebis(phenyl isocyanate), m-xylene diisocyanate, toluene diisocyanate, 3,3'-dimethyl-4,4'-biphenylene diisocyanate, naphthalene-1,5-diisocyanate, and combinations thereof.

5. The thermoplastic polyurethane of claim 1, wherein the polyol component is a polyester polyol selected from the group consisting of poly(L-lactide) (PLA), polglycolide (PGA), or polycaprolactone (PCL), and combinations thereof; or a polyether polyol selected from the group consisting of poly(propylene glycol), poly(ethylene glycol), poly(tetramethylene ether glycol), and combinations thereof.

6. The thermoplastic polyurethane of claim 2, wherein the chain extender component is selected from the group consisting of a cyclic dimer of glutamic acid, serine, lysine, glycine, aspartic acid, cysteine, arginine, histidine, glutamine, asparagine, threonine, hydroxyproline, tryptophan, tyrosine, and optical isomers thereof.

7. The thermoplastic polyurethane of claim 1, further comprising an additional chain extender.

8. The thermoplastic polyurethane of claim 7, wherein the additional chain extender comprises at least one diol chain extender of the general formula HO—(CH$_2$)$_x$—OH wherein x is an integer from 2 to 6.

9. The thermoplastic polyurethane of claim 8, wherein the at least one diol chain extender comprises 1,4-butane diol.

10. A thermoplastic polyurethane, comprising the reaction product of:
    a. a polydiisocyanate;
    b. a substituted 2,5-diketopiperazine of the formula:

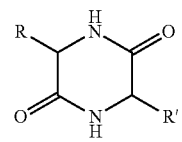

wherein:
R and R' are the side chain of an amino acid containing a functional group comprising —OH, —COOH, —NH, —NH$_2$ or —SH, and R and R' may be the same or different; and
c. a polyol component.

11. The thermoplastic polyurethane of claim 10, wherein the substitution is a symmetrical or asymmetrical substitution.

12. The thermoplastic polyurethane of claim 10, wherein the substituted 2,5-diketopiperazine is present in an amount from 5 wt % to 45 wt % of the total weight of the thermoplastic polyurethane composition.

13. The thermoplastic polyurethane of claim 10, wherein the amino acid is selected from the group consisting of glutamic acid, serine, lysine, aspartic acid, cysteine, arginine, histidine, glutamine, asparagine, threonine, hydroxyproline, tryptophan, tyrosine, and optical isomers thereof.

14. The thermoplastic polyurethane of claim 13, wherein R and R' are the side chains of tyrosine.

15. The thermoplastic polyurethane of claim 13, wherein R and R' are the side chains of lysine.

16. The thermoplastic polyurethane of claim 13, wherein R and R' are the side chains of serine.

17. The thermoplastic polyurethane of claim 13, wherein R and R' are the side chains of hydroxyproline.

18. The thermoplastic polyurethane of claim 13, wherein R and R' are the side chains of glutamic acid.

19. The thermoplastic polyurethane of claim 13, wherein R and R' are the side chains of aspartic acid.

20. The thermoplastic polyurethane of claim 13, wherein R and R' are the side chains of cysteine.

21. The thermoplastic polyurethane of claim 13, wherein R and R' are the side chains of arginine.

22. The thermoplastic polyurethane of claim 13, wherein R and R' are the side chains of histidine.

23. The thermoplastic polyurethane of claim 13, wherein R and R' are the side chains of glutamine.

24. The thermoplastic polyurethane of claim 13, wherein R and R' are the side chains of threonine.

25. The thermoplastic polyurethane of claim 13, wherein R and R' are the side chains of asparagine.

26. The thermoplastic polyurethane of claim 13, wherein R and R' are the side chains of tryptophan.

27. A method of making a thermoplastic polyurethane, comprising the step of (I) reacting:
   a) a polydiisocyanate component;
   b) a polyol component; and
   c) at least one chain extender component comprising a cyclic dimer of an amino acid having a side chain containing a functional group comprising —OH, —COOH, —NH, —NH$_2$ or —SH.

* * * * *